Nov. 20, 1934.                     A. O. AUSTIN                          1,981,717
                                    INSULATOR
                         Filed April 10, 1931          7 Sheets-Sheet 1

INVENTOR
*Arthur O. Austin.*
BY
ATTORNEY

Nov. 20, 1934.  A. O. AUSTIN  1,981,717
INSULATOR
Filed April 10, 1931   7 Sheets-Sheet 2

INVENTOR
Arthur O. Austin
BY
ATTORNEY

Nov. 20, 1934.         A. O. AUSTIN         1,981,717
INSULATOR
Filed April 10, 1931     7 Sheets-Sheet 3

INVENTOR
Arthur O. Austin
BY Alpheus J. Crane
ATTORNEY

Nov. 20, 1934.  A. O. AUSTIN  1,981,717
INSULATOR
Filed April 10, 1931  7 Sheets-Sheet 4

INVENTOR
Arthur O. Austin.
BY
ATTORNEY

Nov. 20, 1934.  A. O. AUSTIN  1,981,717
INSULATOR
Filed April 10, 1931   7 Sheets-Sheet 5

INVENTOR
Arthur O. Austin,
BY *Alpheus J. Crane*
ATTORNEY

Nov. 20, 1934.  A. O. AUSTIN  1,981,717
INSULATOR
Filed April 10, 1931  7 Sheets-Sheet 6

INVENTOR
Arthur O. Austin.
BY
ATTORNEY

Nov. 20, 1934.   A. O. AUSTIN   1,981,717
INSULATOR
Filed April 10, 1931   7 Sheets-Sheet 7

INVENTOR
Arthur O. Austin
BY
ATTORNEY

Patented Nov. 20, 1934

1,981,717

UNITED STATES PATENT OFFICE 1,981,717

INSULATOR

Arthur O. Austin, near Barberton, Ohio, assignor, by mesne assignments, to The Ohio Brass Company, Mansfield, Ohio, a corporation of New Jersey Application April 10, 1931, Serial No. 529,000

18 Claims. (Cl. 173—318)

This invention relates to a process for manufacturing insulators and to the resulting product and has for one of its objects the provision of a process of manufacture by which an insulator may be given a high mechanical strength without increasing its liability to damage by changing temperature conditions.

A further object is to adapt the insulator to the particular temperature conditions to which it is to be subjected when put in service.

A further object is to provide an improved method of assembly that will produce an insulator of improved construction and operation.

Other objects and advantages will appear from the following description.

The invention is exemplified by the combination and arrangement of parts shown in the accompanying drawings and described in the following specification, and it is more particularly pointed out in the appended claims.

In insulators where the dielectric is subjected to mechanical stress, the distortion of the metal parts, as well as the dielectric under either load or thermal stress, is generally a limiting factor on the reliability of the insulator and on the load that it will carry. In general, the stresses set up by differential expansion or contraction of the parts of an insulator, due to the difference between the linear coefficient of expansion of the dielectric and metal members, is independent of the working load. As the metal parts are usually much stronger than the dielectrics, the stress set up due to temperature changes may cause a failure of the dielectric, either through contraction at low temperatures or expansion at high temperatures.

In many forms of insulators it is necessary to have sufficient strength in the metal to prevent serious distortion under working or test loads. As the size of the metal is increased, the stress set up by differential expansion or contraction will increase. In many installations the thermal stresses are at least partially counterbalanced by the force of the load on the insulator. In the case of a suspension insulator, for instance, the contraction of the metal cap on the outside of the dielectric is opposed by the radial component set up inside the dielectric member by the weight carried on the pin, so that should an insulator designed for heavy mechanical loads be worked under mild conditions as to the load it carries, the thermal stress may cause failure owing to the fact that offsetting stress set up by the mechanical load is not present.

This difficulty is overcome by the present invention which may be applied to suspension and bus insulators, to bushigs, and other classes of equipment where it is necessary to transmit a mechanical load from a metal part to a fragile material in which there is danger of setting up a shearing or crushing stress.

Figures 1, 2, 3, 4, 5, 6, 18:
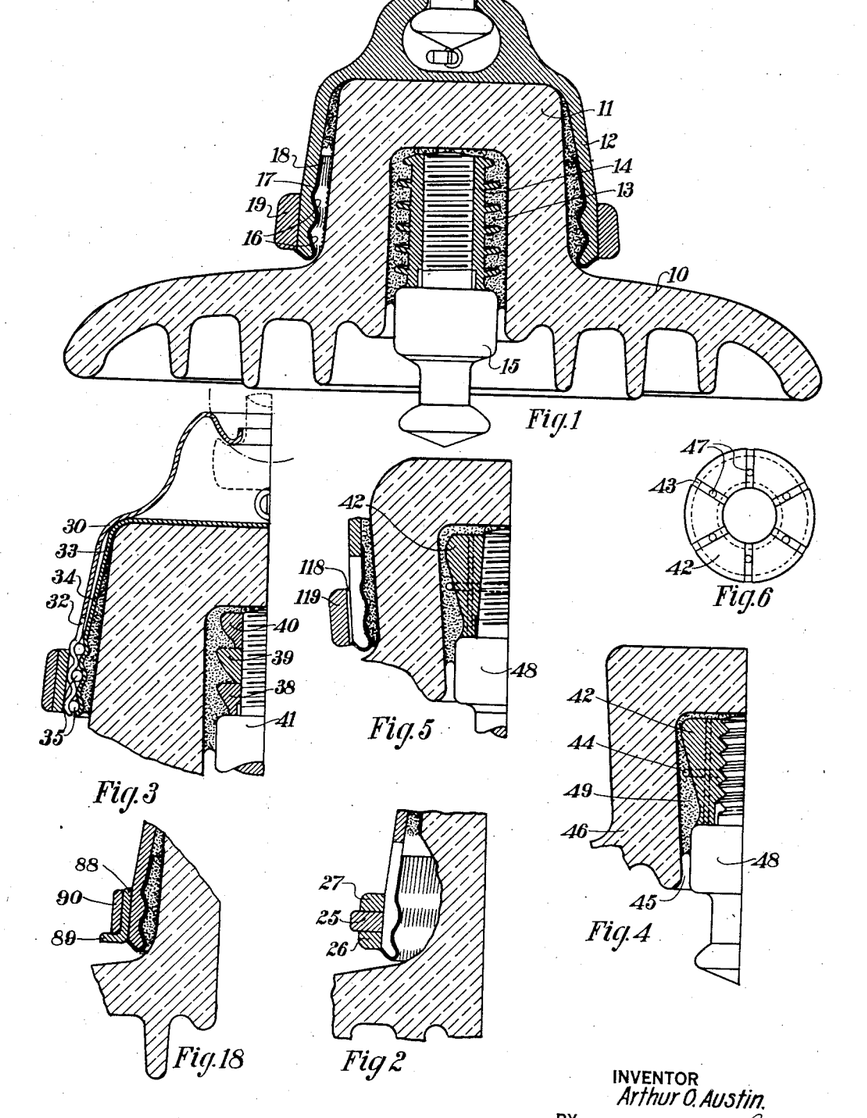
Fig. 1 is a vertical sectional view of an insulator showing one embodiment of the present invention.
Figs. 2, 3, 4 and 5 are fragmentary sections of insulators showing different applications of the invention.
Fig. 6 is a top plan of the insulator pin shown in Fig. 4.
Fig. 18 is a view similar to Fig. 2 showing a modification of the reinforcing band.

In the form shown in Fig. 1 the dielectric member 10 has a head portion 11 to which is cemented a cap 12. The member 10 has a recess 13 and a thimble 14 to which is secured a pin 15. The space between cap and head 11 is filled with a suitable cement. The cap has bearing shoulders 16 and may have a lining material 17 of thin sheet metal or other suitable material that may slide on the shoulders 16. The lining 17 may be creased or corrugated as shown at 18 to permit circumferential expansion and contraction and is pressed into position against the inner surface of the cap.

Under a load on the pin 15 placing the insulator in tension, there is a radial component set up which tends to cause the deformation of the dielectric and the metal transmitting the stress. Where the deformation of the dielectric or metal is too great, the applied load may cause a failure of the dielectric member. This distortion may be taken up by a slipping or wedging action such as that of the liner 17 upon the inner surface of the cap or it may be taken up by a resilient construction. In general, however, there are many applications where the working loads will offset the deformation due to temperature changes. In order that the stress set up by differential expansion of the metal and dielectric may be limited to prevent destruction of the dielectric member, it is desirable that the effective cross section of the metal parts be limited. A construction having light metal parts which limits the stress due to differential expansion may not be suitable when used on a heavy load as the heavy load may cause too great a distortion in the metal parts. However, the thermal stress due to the differential expansion or contraction may be so high when the parts are large that when the insulator parts are worked on light loads, they may be more in danger of failure due to the stress set up in the dielectric than where they are working on heavy loads, as in the latter case a portion of the stress set up by the differential expansion of contraction may be offset by the working load so that the parts tend to maintain a more nearly normal position than when working under the light load and subjected to material differences in temperature.

From the construction and manufacturing standpoint, it would be of distinct advantage if it were possible to limit the stress set up by differential expansion wherever possible. This requires light cross sections in the metal. If, however, insulators having light effective cross sections in the metal are used for heavy working loads, the distortion will be so great that the dielectric might easily fail.

In my improved type of construction a reinforcing band is applied to the insulator after the other parts are assembled. One form of the reinforcing band is shown at 19. The cap is made slightly tapered and the reinforcing band 19 is forced on by any convenient means such as hydraulic pressure after the cap has been cemented to the porcelain and the cement has hardened. The force for applying the ring 19 may be confined entirely to the cap member by placing a pin 20 in the cap to hold it in position while the ring 19 is forced down. If for any reason it is desired to lift the ring, pressure may be placed on top of the cap and a grip member applied to the ring, in which case the ring may be removed or readjusted.

One method of applying the rings is to control the relative temperature of the insulator and cap with respect to the ring at the time they are assembled. If the ring is hot and the cap is cold, it is evident that the two parts may be slipped together, after which the ring will be tight when the cap and ring assume the same temperature. Either a combination of temperature control and pressure or pressure or temperature alone may be used for setting the ring. This method of assembly produces some very distinct advantages in the insulator which have not heretofore been possible with the normal types of construction.

In my prior Patent No. 1,737,749 I have shown the advantage of using a material for a reinforcement having a difference in linear coefficient of expansion from the cap material. In the present improvement this advantage may be utilized but in addition an initial stress is set up in the insulator due to the forcing on of the band after the assembly of the insulator. With the improved type of construction, it is possible to cure the cement at practically any desired temperature. This makes it possible to obtain greater uniformity in the cement as well as better mechanical strength.

By setting up the proper reaction through the band, it is possible to give the insulator stress conditions that make it more suitable for a given locality or a given load. If an insulator is operated at temperatures which are relatively high, the cap will have a larger diameter with respect to the dielectric than a like cap would have if the insulator is operated under temperatures which are generally lower. If the loads are the same in the two cases, the insulator operating at the higher temperature may not have a sufficient bearing or pressure from the cap. This may permit distortion of the dielectric and failure of the member mechanically. With the improved type of construction this may be readily corrected as a higher initial pressure may be set up by the band in the case of the insulator intended for higher temperatures. In order to do this the band would be made slightly smaller or greater force would be used in pressing it into position. This would tend to cause a contraction in the cap so that the whole would be equivalent to the assembly of the insulator at a higher temperature.

It is evident that the stress may be controlled by the initial tension placed in the band and also by the size of the band or effective cross section area. It is readily seen that the mechanical characteristics of the insulator may be materially changed after assembly in order to meet different conditions. By controlling the relative cross sections of the cap and the band and the use of materials of different linear coefficients of expansion, it is possible to set up entirely different stresses to meet various working conditions. With the improved method it is possible to use a cap of thin enough cross section so that the low temperature will not be sufficient to cause the failure of the dielectric. At the same time a reinforcing band may be used which will have the necessary strength for a high mechanical load. By using a material such as invar or one having a linear coefficient of expansion at or lower than that of the dielectric, it is possible to maintain practically any desired condition over a wide range of temperature. In general, low temperatures produce increased loads on the insulator and it is therefore advisable under such conditions to have a cap which has a higher linear coefficient of expansion than the dielectric so the contraction of the cap will offset the increased stress due to the increased working load at low temperatures. If, however, a high load or tension is applied to an insulator having such a cap under normal temperature, the cross section of material may not be sufficient to withstand the stress. The use of a band, therefore, which will have the necessary mechanical strength to resist the distortion due to the applied load can be used to increase the working limits.

By the proper regulation of the initial stress set up by forcing on the band and of the relative cross sections of material and their linear coefficients of expansion, it is possible to make an insulator which will withstand high mechanical loads without the necessity of compensating for distortion of the parts by slipping or wedging. This is advisable for where the parts slip or wedge during one operating cycle of temperature changes, the next cycle may cause failure due to increased stresses set up because of the changed relation of the parts. The present invention, however, is of very great benefit to insulators where any part of the distortion is compensated for by slipping or relative movement of the parts as this movement may be materially reduced or the stress tending to cause destruction, due to the temperature cycle, controlled.

In Fig. 1 the sleeve or liner 17 is placed adjacent the metal. This tends to control the coefficient of friction between the liner and the cap. In the event of any movement between the liner and the cap, the metal liner will tend to prevent the cement from crumbling which may be serious where the cement bears directly upon the metal cap or upon a coating placed upon the cap.

The invention provides means for controlling the stress set up in the dielectric to meet different combinations of working loads and temperatures or combinations of test loads, working loads and temperatures and at the same time, maintain more favorable conditions in the dielectric. The reinforcing bands may be made up in a single or several pieces and in a variety of sizes. If desired, the reinforcing band may be of a composite structure as shown in Fig. 2 in which the central portion 25 is made of steel or a material having a linear coefficient of expansion considerably higher than the bands 26 and 27. This makes it possible to taper off the stress so as to prevent destruction by shearing. In fact, in some cases it may be possible to use a material having a very high linear coefficient of expansion for temperature changes, such as copper. It is also possible to confine all resultant stresses to the reinforcing bands using slotted or other convenient form of cap. With the arrangement shown, it is possible to use an insulator having a rather light cap construction suitable for the normal working conditions such as where insulators are used in suspension position or for bus insulators where the working loads are light, as these members are subjected to rather light bending moments. Should it be desired to use the insulator for heavier working loads or where control is necessary for temperature or combination of temperature and load, a proper reinforcing band may be applied to make this insulator suitable for this condition It is therefore seen that the properties of the insulator may be controlled without the disadvantage of setting up high abnormal stresses due to differential expansion or contraction, particularly where the loads are light.

With the construction it is also possible to assemble insulators at normal temperatures and set up the necessary cap reaction by the proper application of a reinforcing band. Should it be desired to change the characteristics of the insulator at any later time, the band may be removed or reset to change the properties. It is evident that the stress set up by the reinforcing band or bands may be used together with the temperature of assembly to set up favorable conditions of stress for working loads or to set up ultimates under test.

The invention makes it possible to use pressed metal caps to obtain a balanced condition between working load and thermal contraction. The reinforcing band provides the necessary section of material to withstand working loads and to prevent the slipping of the metal parts at higher temperatures so that mechanical failure would result.

In the form of the invention shown in Fig. 3, other advantages of this type of construction are made use of. An insulator cap is formed with a pressed metal body 30. The lower edge of the cap is provided with slots 32. The head of the insulator section is equipped with a thin metal shell 33 which is attached to the head by cement 34. The stress is transferred from the envelope covering the head to the cap through tubular members 35, the walls of which may be formed by thin resilient metal or by helically wound spring wire more fully described and claimed in my prior application Serial No. 453,180, filed May 17, 1930. There may be as many sets of these helical members as desired. It will be apparent that the walls of these tubular members will yield under excessive pressure to limit the pressure transmitted to the cement and dielectric member. In order to assemble the insulator, the cap member 30 is shoved down over the envelope 33 with the members 35 in place. In order to locate the members 35, it may be necessary to bend out a portion of the cap 30 between slots or to spring the whole lower portion out so as to permit the insertion of the members 35. When the reinforcing band 36 is applied, the cap is brought into proper position so that the members 35 will rest on proper bearing shelves. The reinforcing band 36 may be made up as several members or as a composite member. In Fig. 3 the band is made up in two sections. The inner portion has a relatively high linear coefficient of expansion as compared to the outer portion. This will provide the necessary cross section of material to withstand heavy working or test loads but will tend to limit the change in diameter due to changes in temperature, making it possible to reduce the movement in the members 35 necessary to compensate for distortion in the dielectric, in the cement, or in the cap. With a close control of the stress or distortion, it is possible to use relatively small members and still provide the necessary compensation without danger of the insulator head separating from the cap under working loads. With a small differential movement due to temperature or working load, it is seen that the reliability and the relative size of the parts may be changed materially to give the desired results. Where this control is rather close the members 35 may be made of wire or small tubes and the two parts may be placed together by threading. The method is also applicable to the threaded type of construction shown in my prior Patent No. 1,291,713.

The effect of temperature changes may be further reduced by applying compensating members 38, 39 and 40 to the pin 41. If these members are formed of invar or other material having a low coefficient of expansion and contraction for temperature changes, the effects of such changes will thus be further reduced. If it is desired to counteract the effects of linear expansion and contraction on the pin, this may be done by providing bearing members like those shown at 42 in Figs. 4, 5 and 6. In this construction the bearing portion of the pin is made up of a plurality of segments 42 surrounding the pin and separated by slots 43. The bearing member is thus formed of segments to facilitate assembly. The segments 42 are all assembled with the slots 43 closed and are held in position by an elastic band 44. This permits the assembled parts to be passed through the lower end of the opening 45 in the porcelain 46. When the parts are in position within the porcelain, rods 47 are inserted in the slots 43 to spread the segments 42 a sufficient amount to permit the pin 48 to be threaded into the central opening. The cement 49 may then be poured into the space surrounding the segments 42. If the segments 42 are made of material having a low coefficient of expansion for temperature changes, they will prevent stresses being set up in the porcelain by expansion of the pin when temperatures rise. Such expansion normally adds to the stresses of the load on the insulator and where they can be avoided, the danger of failure under high temperatures is reduced.

In the modification shown in Fig. 5 the pin 48 is provided with a tapered thread to facilitate insertion of the pin and to produce an expansive action tending to separate the segments 42 within the recess in the porcelain.

Figure 7:
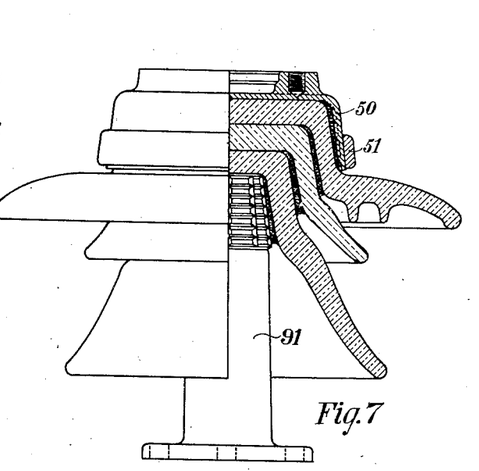
Fig. 7 is part elevation and part section of a bus insulator with the invention applied thereto.

Fig. 7 shows the application of the invention to a bus insulator having a cap 50 to which the reinforcing band 51 is applied in a manner similar to that described in connection with Fig. 1.

Figure 8:
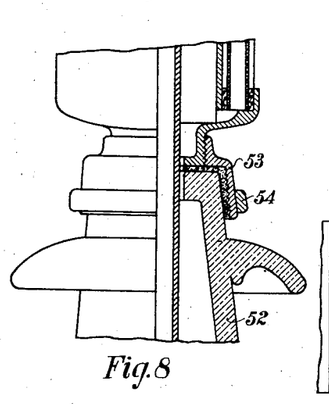
Fig. 8 is a fragmentary elevation and section showing the application of the invention to the cap of a bushing insulator.

Fig. 8 shows the upper end of a bushing insulator 52 having a cap 53 provided with a reinforcing band 54. In both Figs. 7 and 8 the initial pressure is obtained after the caps are cemented to the porcelain by pressing the rings upon the tapered surfaces of the caps.

Figure 9:
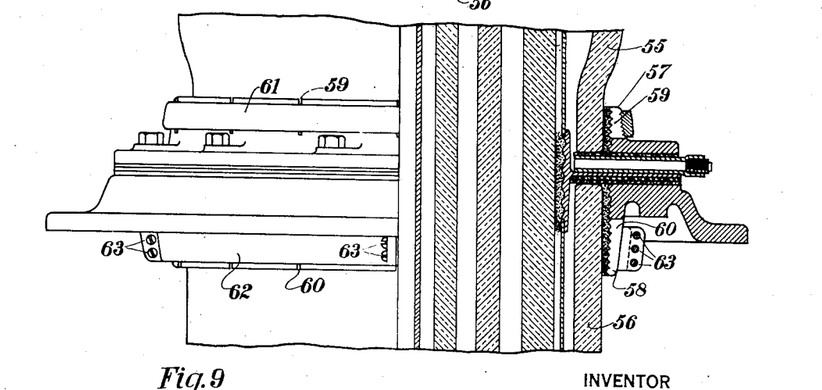
Fig. 9 is a fragmentary elevation and section showing the invention applied to the flanges of a bushing insulator.

In Fig. 9 the invention is applied to the flanges of a bushing insulator having upper and lower shells 55 and 56. The flanges 57 and 58 may be slotted as shown at 59 and 60, and the upper reinforcing band 61 may be threaded into place by means of a tapered thread to give the desired initial pressure while the lower band 62 is made in sections secured together by bolts 63 which are tightened to give the desired initial pressure. Any desired initial stress may be introduced into the bands by tightening the bolt 63 or by screwing the band 61 down upon its threaded connection with the flange 59. In this method of assembly the initial stress in the bands 61 and 62 may be accurately adjusted.

Figure 10:
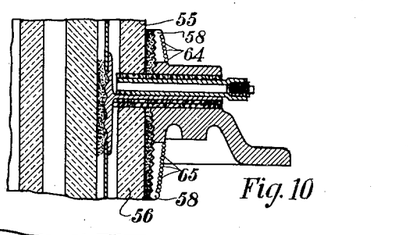
Fig. 10 shows another application of the invention to a bushing flange.

Another manner of applying the reinforcing bands is shown in Fig. 10 which shows bushing insulator parts similar to those in Fig. 9, but in Fig. 10 instead of the bands 61 and 62 the flanges 57 and 58 are wound with wrappings of wires 64 and 65. The initial pressure may be regulated by the tension in the wire as it is wrapped upon the flanges. The bands 51, 54, 61 and 62 and the wires 64 and 65 may be made of invar if conditions require this material although, as pointed out in connection with Figs. 1 and 2, in many cases other materials will suit the conditions to which the insulator is to be subjected.

As pointed out in connection with Figs. 4 and 5, the elongation of the pin under load stress and temperature changes and the radial expansion and contraction is apt to set up undue stress in the dielectric. This difficulty may be largely remedied by the construction of pins shown in Figs. 11 to 14 inclusive.

Figure 11:
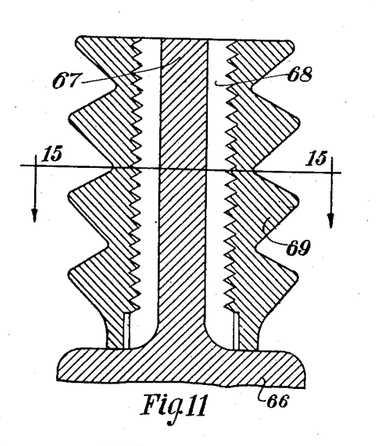
Figs. 11, 12, 13 and 14 are sections of insulator pins showing modifications of the invention.

In Fig. 11 the main body of the pin 66 may be made of steel, the portion 67 being slotted as shown at 68 and threaded to receive a sleeve or thimble 69 which may be composed of metal having a low coefficient of expansion for temperature changes. The sleeve 69 will not only control longitudinal elongation but will also control radial expansion and contraction; the slots in the portion 67 being provided for the purpose of permitting the inner portion 67 to yield to the outer portion. A more thorough control of the expansion and contraction by the outer portion 69 may be obtained where the inner portion 70 is made hollow, as shown at 71, and provided with tangentially directed slots 72.

Figure 12:
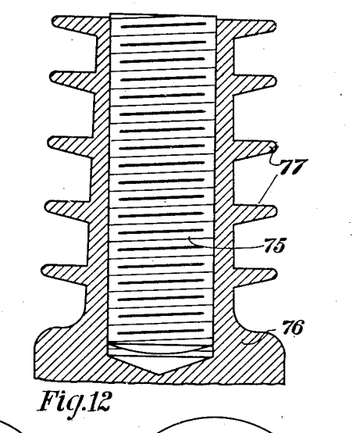
Figure 17:
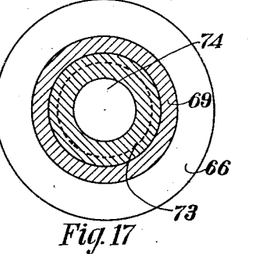

Very good results may be obtained in some cases by simply providing the core portion 73 with an internal opening 74, as shown in Fig. 17. Longitudinal elongation under load and temperature changes may be effected or controlled by threading the central core member 75 through the central portion of the pin as shown in Fig. 12. The pin 76 may be provided with resilient flanges 77, similar to those shown in my prior Patent No. 1,489,689.

Figure 13:
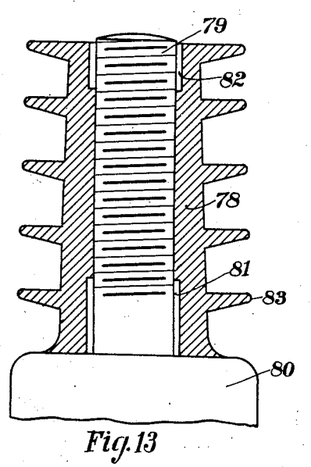
Figure 14:
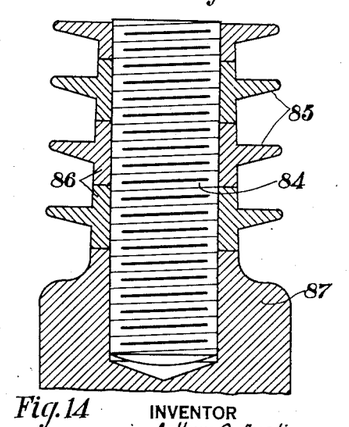
Figure 15:
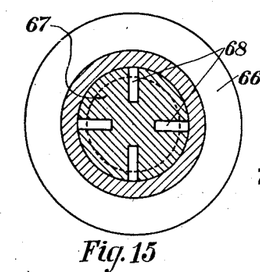
Fig. 15 is a section on line 15—15 of Fig. 11.
Figure 16:
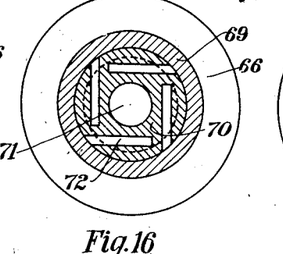
Figs. 16 and 17 are views similar to Fig. 15 showing modifications.

Instead of threading an invar plug 75 into the center of the pin, an invar sleeve 78 may be threaded about a central spindle 79 formed integral with the pin 80, as shown in Fig. 13. In this case it may be advantageous to provide blank spaces 81 and 82 so that the load will be applied near the central portion of the sleeve 78. This will prevent elongation of the sleeve under load which would tend to concentrate the load on the lower flange 83.

Where a central plug is used, as shown at 84 in Fig. 14, the resilient flanges 85 may be formed on separate collars 86 which are threaded into place upon the plug 84; the plug being threaded or otherwise secured in the body 87 of the pin.

Figure 19:
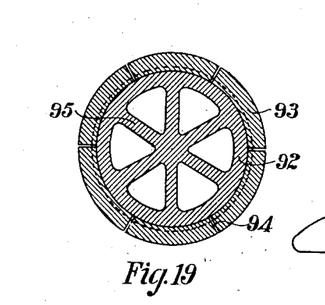
Fig. 19 is a horizontal section of a modified form of pin for the insulator shown in Fig. 7.

In the modification shown in Fig. 18 the reinforcing band 88 is made of drawn metal and provided with a radially extending flange 89. This permits the band to be formed of thin stock and the flange 89 will give added strength. If desired, the portion of the band above the flange 89 may be reinforced with a supplemental band 90.

Where metallic members are placed inside fragile dielectric members, such as porcelain or glass, it is frequently difficult to prevent the expansion of the internal member from breaking the outer member and where the members are heavy, as in the case of heavy bus insulators, it is also difficult to maintain tightness and mechanical strength at low temperatures as there is a tendency for steel or iron used for the metallic members to shrink away from the dielectric, which has a lower linear coefficient of expansion for changes in temperature. A construction of this kind is shown in Fig. 7, and Fig. 19 illustrates one means of overcoming this difficulty.

By making the outer wall of the metallic member pin 91 of light material, it is possible to place a reinforcing ring 92 inside of the outer shell 93. Where this inner member is made of invar or other material having the proper linear coefficient of expansion, although the section of the member may be large, excess pressure will not result due to the stress set up by the expansion of the metal, as this stress will be limited by the limited cross section of the band 93. If desired, the band 93 may have slots 94 which will practically remove any radial stress set up by expansion of the member 93. The band 92 may be reinforced by a spider or struts 95 and, if desired, suitable struts or spider may entirely replace the band 92. By screwing the band 92 to the outer shell 93 or fastening it in any convenient way, the band may be used to control the longitudinal stress caused by expansion or contraction, as well as the radial expansion and contraction. In general, however, it is necessary to control the radial stress only in many cases. This is particularly true where the members cemented into the dielectric are provided with resilient fins or flanges.

This type of construction makes it possible to cement or otherwise attach metallic members inside of porcelain or other fragile members without the danger of breakage which would be serious without control of the rate of expansion or contraction for changes in temperature. With this construction it is possible to obtain the proper distribution between longitudinal and radial stresses in the metal members attached, and also to make them conform closely to the rate of expansion or contraction of the members to which they are attached.

Figure 20:
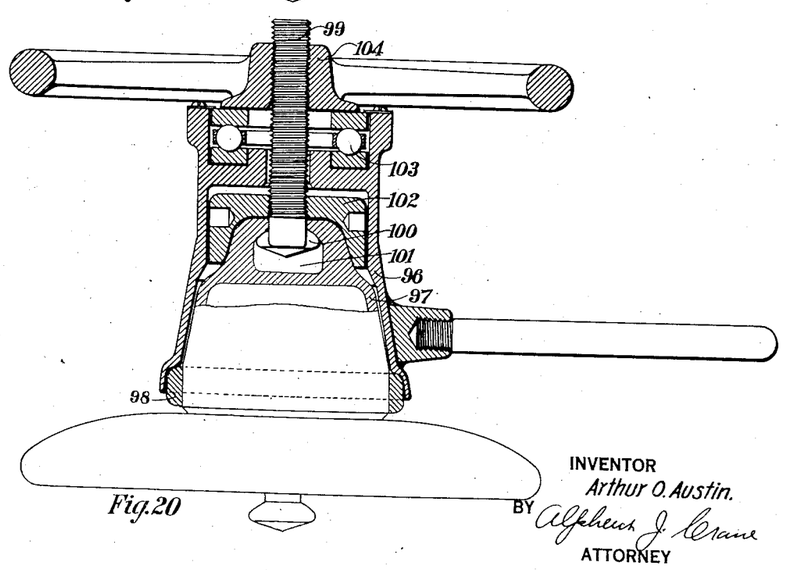
Fig. 20 is a vertical section of one form of apparatus for performing a part of the process of the invention.
Figures 21, 22:
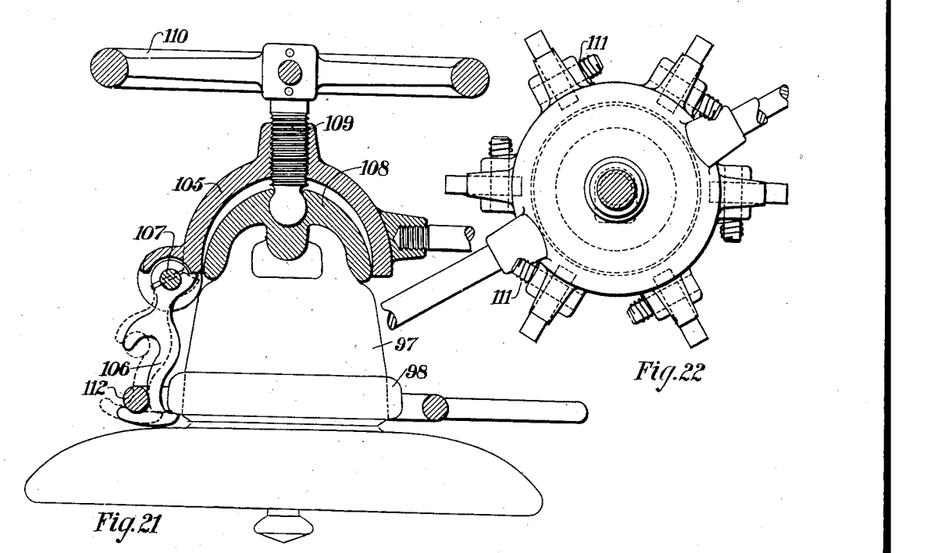
Fig. 21 is a vertical section of a device for performing another step of the invention.
Fig. 22 is a fragmentary plan of the device of Fig. 21.

One form of apparatus for applying reinforcing bands to insulator caps after the insulators have been assembled is shown in Fig. 20 in which a frame 96 is arranged to fit over the insulator cap 97 and to bear from the reinforcing ring 98. A threaded pull bar 99 is provided with a head 100 which fits into the socket 101 of the cap. A screw head 102 is threaded on the bar 99 and serves to clamp the pole bar in the socket. The frame 96 is provided with a roller bearing 103 which supports a hand wheel 104 threaded on the outer end of the bar 99. With the parts in place as shown, rotation of the hand wheel 104 will press down upon the frame 96 and will exert tension on the bar 99, thus forcing the reinforcing band 98 on to the cap 97 with any desired pressure. For relieving pressure of the band on the cap or for withdrawing the band, the device shown in Figs. 21 and 22 may be used. This device comprises a spider or yoke 105 having grappling hooks 106 pivoted thereto at 107. A head 108 bears on the upper end of the cap 97 and is adapted to exert pressure thereon by means of a screw 109 threaded in the yoke 105. The screw is rotated by a hand wheel 110. Springs 111 act to hold the grappling hooks 106 in their outermost position, as shown in broken lines in Fig. 21. A hoop or band 112 encloses the grappling hooks and may be forced downwardly into the position shown in full lines in Fig. 21 in which the hooks are forced into position beneath the band 98 and held in this position. Rotation of the hand wheel 110 will then lift the yoke 105, together with the hooks 106 and band 98, to withdraw the band or relieve the pressure on the cap 97.

Where a reinforcing band is pressed on to a tapered surface, as illustrated in Fig. 20, or where the band is shrunk on, it may be difficult to secure accurately the most advantageous degree of compression of the band upon the cap and, in some cases, it may be desirable to provide means for limiting the pressure so as to secure within limits the desired amount of pressure. This may be done by crimping or corrugating the reinforcing band, as shown at 113 in Figs. 23 and 24. Where the band is corrugated in this way, the corrugations will tend to straighten out when the compressive force reaches a given value, thus limiting the compression of the band upon the cap 114.

Figures 25, 26:
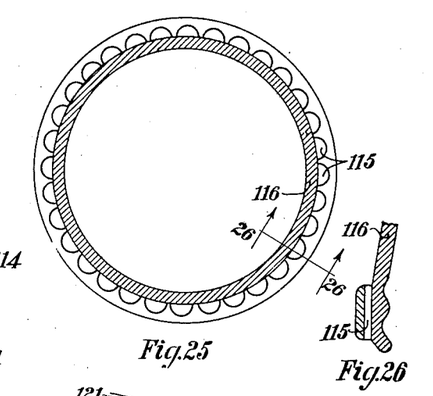
Figs. 25, 27 and 35 are views similar to Fig. 23 showing other modifications.
Fig. 26 is a section on line 26—26 of Fig. 25.

A similar result may be secured in the manner shown in Figs. 25 and 26 in which the band is provided with spaced contacts 115 bearing upon the cap 116.

Figures 27, 28, 29, 30, 31, 32, 33, 34, 35, 36:
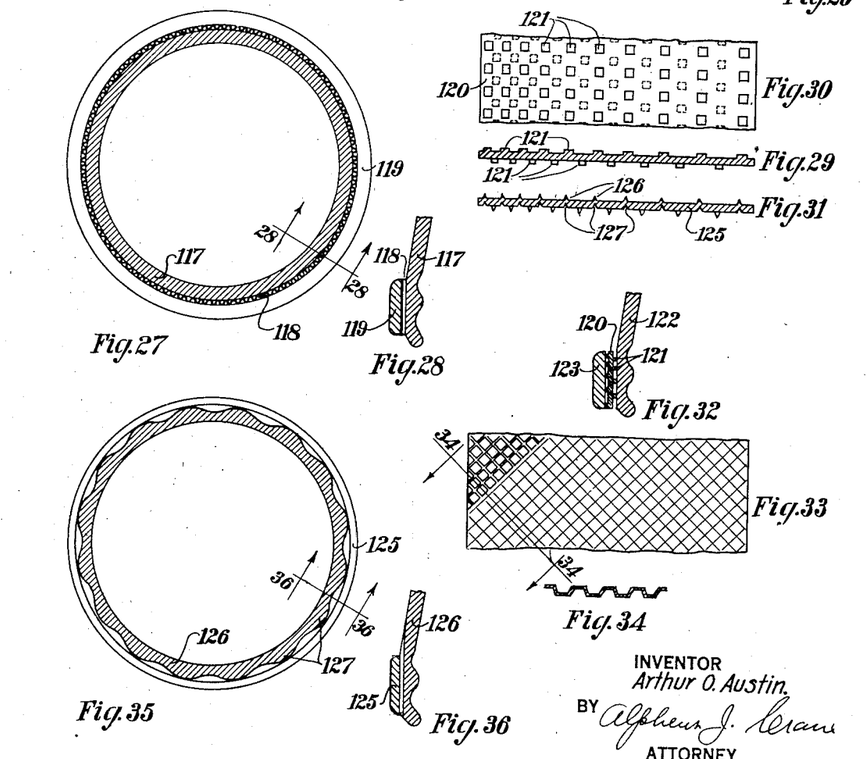
Fig. 28 is a section on line 28—28 of Fig. 27.
Fig. 29 is a section of an insert strip.
Fig. 30 is a plan view of the strip shown in Fig. 29.
Fig. 31 is a view similar to Fig. 29 showing a modified form of strip.
Fig. 32 is a view similar to Figs. 24, 26 and 28 showing another application of the invention.
Fig. 33 is a plan view of another form of insert strip.
Fig. 34 is a section on line 34—34 of Fig. 33.
Fig. 36 is a section on line 36—36 of Fig. 35.

In Figs. 27 and 28 the compressive force upon the cap 117 is limited by inserting a corrugated sheet of metal or other material 118 between the reinforcing band 119 and the cap. The interposed sheet 118 may be made simply of corrugations, as shown in Figs. 27 and 28 or it may be composed of a base strip 120, shown in Figs. 29 and 30, having spaced projections 121 on its opposite faces. The compressive force may be graded where desired by grading the resiliency of the interposed band either by increasing the strength in the material or the number of corrugations or projections. This is illustrated in Figs. 29 and 30 in which the projections are arranged closer together at one edge of the strip than they are at the other.

Fig. 32 shows the strip in place between the cap 122 and the band 123. It will be noted that the projections 121 are closer together at one edge of the band than they are at the other in order to grade the compressive force.

Fig. 31 shows a strip 125 having points 126 pressed outwardly thereon by forming recesses 127 on the side opposite the projections.

An insert may be made up in the manner shown in Figs. 33 and 34 in which a thin sheet of metal is stamped to provide alternate depressions and projections, as shown in the sectional view in Fig. 34.

Figures 23, 24:
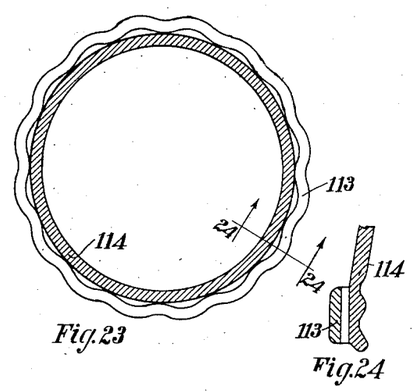
Fig. 23 is a horizontal section of a cap having a modified form of the invention applied thereto.
Fig. 24 is a section on line 24—24 of Fig. 23.

A result similar to that secured in Fig. 23 may be produced by the construction shown in Figs. 35 and 36. In this case in place of corrugating or fluting the reinforcing band 125, the outer face of the cap 126 is provided with spaced ribs 127. When the band 125 is forced into place, the stress exerted will be limited by the fact that the portion of the band between the ribs will tend to straighten out when the stress reaches a given amount.

Figure 37:
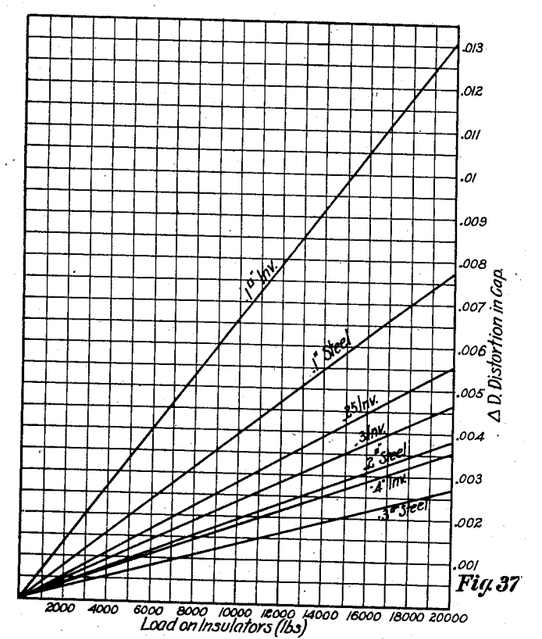
Figs. 37, 38, 39 and 40 are diagrams illustrating the effects of the invention.

The value of the invention may be seen by reference to the diagrams shown in Figs. 37, 38, 39 and 40. In Fig. 37 is shown the approximate diametrical expansion of a cap such as that shown in Fig. 1, due to various loads placed on the cap. It will be noted that as the effective cross section of metal resisting the radial stress is decreased, the distortion is increased for a given load. Since the dielectric member is fragile, the distortion of the metal members may set up sufficient strain to rupture the dielectric member. It is therefore advisable that a sufficient cross section of metal be used to resist the applied loads, so that the distortion will not be such as to cause rupturing of the dielectric.

Where the cross section of metal is made of steel, malleable iron or bronze, the stress set up by the contraction or expansion of the material due to changes in temperature may be such that the mechanical strength of the combination will be destroyed, or the dielectric be ruptured. By using a combination of the metals, preferably one having a lower linear coefficient of expansion for changes in temperature than the dielectric, it is possible to use a large cross section of metal so that the distortion will not be excessive under the imposed loads and, at the same time, it will be possible to limit the stress set up by differential expansion or contraction so that changes in temperature will not cause destruction of the dielectric.

Figure 38:
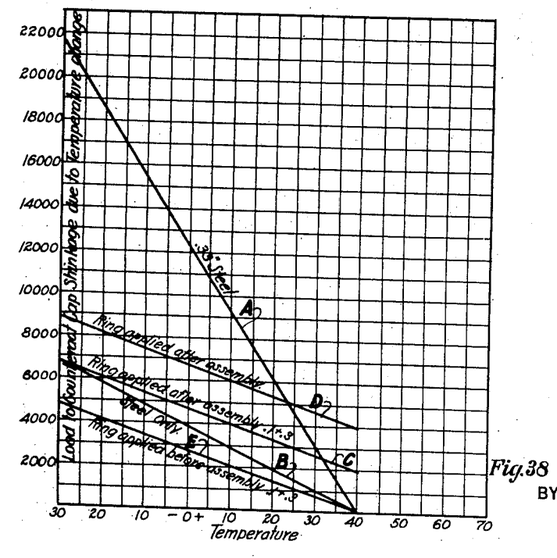

While Fig. 37 shows that the distortion may be reduced by using a sufficient cross section of material in accordance with well-known laws, Fig. 38 shows the load on an insulator necessary to overcome contraction of the cap for different temperatures lower than the assembly temperature. In Fig. 38 it is assumed that the metal parts have been cemented to the dielectric at a temperature of 40° and that under operating conditions the temperature may lower. While the diagram applies directly to suspension or bus bar insulators, the principal illustrated also applies to many other types although the ratio of stress to a given change in temperature may vary considerably.

By referring to Fig. 38, it is seen that for an effective cross section of 33/100 of a square inch of metal in a steel cap, while there will be no load required at the assembly temperature to maintain the cap in the same position, if the temperature should drop to 10° a load of over 9,000 pounds would have to be applied to the insulator to maintain the cap in its original position. In other words, this load must be applied to prevent contraction of the cap due to drop in temperature. If the temperature should drop to −30°, a load of over 21,000 pounds would have to be applied to maintain the cap in the original position. In operation the loads placed upon the insulators do not vary at this rate, but in general the increase in load may not be more than 10 to 50 percent from the highest operating temperature to the lowest operating temperature. It is therefore seen that there will be a large unbalanced stress where the cross section of metal is large. With a large unbalanced stress due to the use of large or strong metallic members, the dielectric may be ruptured due to the contraction or expansion of the metallic members. By using a very thin cross section of steel or iron it is possible to reduce greatly the rate of change.

Curve A, Fig. 38, shows the relation existing where the cross section of steel is 33/100 of a square inch, and B shows the relation for $\frac{1}{10}$ of a square inch only. By reference to Fig. 37 it will be seen that the distortion for heavy loads is very great with $\frac{1}{10}$ of a square inch of metal, and by reference to Fig. 38 it will be seen that the load stress necessary to balance the thermal stress will be very large with the larger cross section of metal. It is possible, however, to obtain the advantage of both the large cross section for resisting distortion under load, and the advantage of the small cross section to keep down the thermal stress, by using a compound construction where one of the metals has a low linear coefficient of expansion. If a band such as 19 in Fig. 1, having an effective cross section of $\frac{1}{10}$ of a square inch is forced on the cap, the load on the insulator necessary to balance the tendency of the cap to contract for different temperatures is shown by the curve C, Fig. 38. From this it will be seen that it is possible to set up a stress in the cap at or above the assembly temperature to balance the load stress. The slope of the stress line C is more in line with stress set up by the load for different temperatures frequently met under operating conditions. It will be seen that a load of 2,000 pounds may be applied at the assembly temperature to balance compression on the cap due to the force set up by shrinking or forcing on the band 19. Since, however, this band has a lower rate of contraction than either the metal of the cap or the dielectric, the maximum load necessary to balance the thermal stress at −30° is less than 7,000 pounds, and need not be any greater than that for the steel cap without a band having $\frac{1}{10}$ of a square inch in section. It is therefore seen that by the proper relation of cross sectional areas and the proper initial stresses set up by forcing on the band, the slope of the curve for balanced conditions may be made very flat, or in fact may be made to drop off if desired with the reduction in temperature. By using a greater force in the band or proper assembly temperatures, the stress line may be raised from C to D. If the ring is applied before assembly, the condition is represented by E.

It is evident from the diagrams that it is possible to change materially the mechanical characteristics of the insulator as the stress set up by the different elements vary by changing the cross section of the material or the relative linear coefficients of expansion for the different materials or by the initial stress set up by the application of the component parts after assembly. The advantages are more clearly shown in Fig. 39 in which the materials used in the reinforcing or compensating bands have the same linear coefficient of expansion as the material of the cap. In this sheet the advantage gained by application of the bands after assembly is clearly shown. F refers to a cap having a small cross section of material and G refers to a cap of twice the cross section, and H refers to a cap of considerably greater cross section. I represents the working load on the insulator for different temperatures.

Figure 39:
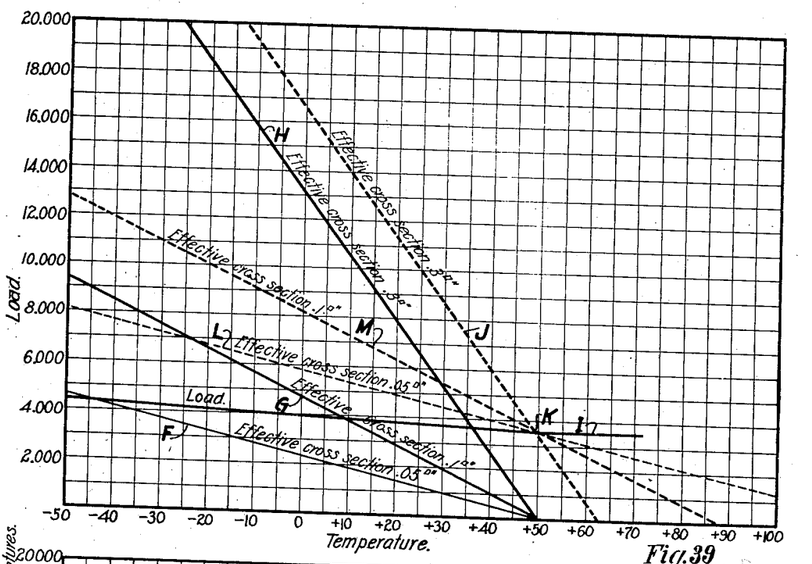

It will be seen that the insulator has a working load of nearly 4,000 pounds at the assembly temperature, which working load does not decrease materially for temperatures in excess of the assembly temperature to which the insulator may possibly be subject. If, however, a cap having a large cross section as shown in H is used, it will be seen that there is a considerable unbalanced stress at the assembly temperature. For a temperature of −30° the insulator should have an applied load of approximately 18,500 pounds to offset the tendency to contract due to the lower temperature. Since, however, the maximum load on the insulator is slightly over 4,000 pounds, it will be seen that there is an unbalanced stress due to the difference of these two, or over 14,000 pounds. This may result in failure of the insulator as the contraction may cause a rupture of the part by shearing or otherwise, which is a common fault in bus insulators and suspension insulators, the failure in the latter case being termed "doughnutting".

It is seen that in order to balance the working load for the higher temperatures, it will be necessary to increase the assembly temperature. The line H will then be changed to J where it is desired to set up a given reaction at 50° just sufficient to balance the effect of the load at that temperature. In this case, however, the unbalanced load at the low temperature will be greater. It may also be difficult to reach a sufficiently high assembly temperature. By using a small effective cross section of the cap as in F, however, a comparatively flat line results. If all the stress is taken up by the reaction band which is easily the case where the cap member is slotted as shown in Fig. 2, F would represent the stress temperature line where the band was applied before assembly. If, however, it is desired to set up a stress in the band at assembly temperature to meet the effect produced by the load as indicated at the point K, the band may be applied after assembly, in which case L represents the balanced load temperature line. It will be seen that in this case the unbalanced load at —20° is approximately 2,500 pounds as against 14,000 pounds for the heavier cross section of material. It is also seen that the application of the band so at to set up initial stress is equivalent to a very high assembly temperature; the equivalent assembly temperature being shown where line L intersects the base line. If the loads are heavier or it is desired to obtain a steeper curve for the lower temperatures, the larger section G may be used. If this section is used entirely in the band, the stress line is shown by M. If conditions require part of the stress may be set up by a section in the main cap portion, and part in the band. It is evident that the above principles apply for different assembly temperatures or working loads, as well as the ones chosen for illustration; it being possible to correct for almost any desired range.

Figure 40:
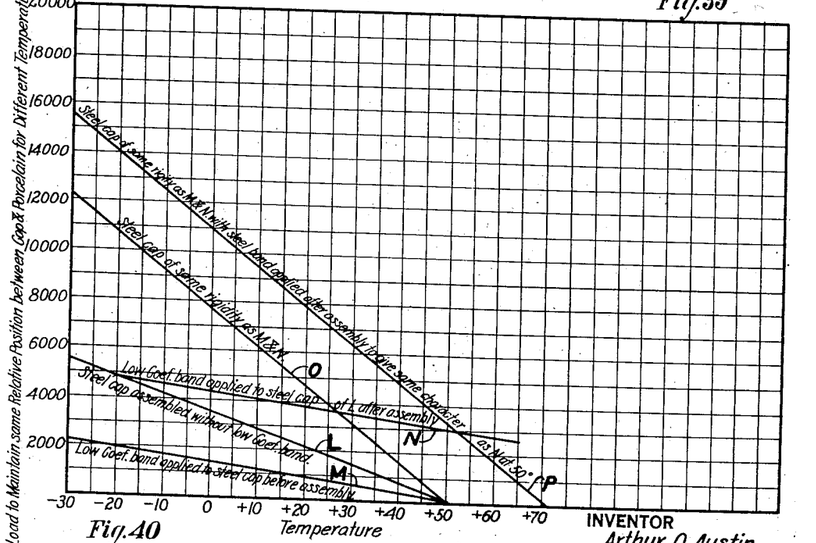

Fig. 40 shows the advantage in applying a band having the necessary cross section of material but composed of material having a lower linear coefficient of expansion than the material of the cap. Fig. 40 shows that it is possible to flatten the curves very materially and at the same time use a section of material large enough to keep down the distortion shown in Fig. 37. Some of the advantages of this arrangement are shown in Fig. 38, but more fully in Fig. 40.

In Fig. 40 the metal cap is allowed to expand or contract with the porcelain or dielectric and it is assumed that a load is applied which will just maintain the same relative position between the metal and dielectric for change in temperature without setting up any stress in the dielectric due to contraction. L represents the load for the different temperatures to maintain the same relative position of a steel cap with respect to the porcelain.

By applying a band having a lower linear coefficient of expansion for changes in temperature than the dielectric, it is possible to have a load line M where the band is applied before the assembly of the cap to the insulator by cementing. If, however, it is desired to have an insulator which will carry an appreciable load, even at the higher temperatures, the band of low coefficient material may be forced on or assembled after the cement has hardened, in which case the load line is represented by N. By using suitable materials and of the proper relative cross section in the band and in the cap, it is practical to give the slope of the load line N practically any slope, making this load line rise with reduction in temperature or to fall if necessary. As the load line N represents very nearly approximate load conditions which may be applied to insulators in practice, it will be seen that the construction has the advantage of considerable rigidity for the parts yet, at the same time, has a comparatively flat load line. If the same rigidity is obtained in a steel cap, the load line will be represented by O. If it is desired to raise the load line for the higher temperatures so that the load line N and that for a steel cap of the same equivalent rigidity will be the same at 50°, the load line of the steel cap will be represented by P. This result can be obtained by increasing the assembly temperature for the cap used in O or by making the body of the cap thin and forcing on a steel band of proper cross section. If desired, the cap initially cemented to the insulator may be entirely resilient, having little or no radical mechanical strength; all of the strength being provided in the band which is forced into position.

It is seen that the forcing on of a band or its application under a given temperature makes it possible to regulate the stress or reaction between the metal members and the dielectric to offset the load or distortion due to the load. The same applies equally where a band or strut is placed on the inside of a piece. The method is particularly applicable where it is desired to grip insulator shells or tubular sections both inside and outside; the method making it possible to set up practically any desired loading or initial stress between the metal and the porcelain and to maintain practically any relation between the metal and the porcelain for changes in temperature.

Fig. 5 illustrates one method of producing initial pressure on an internal member in which the tapered pin 48 is screwed into final position after the setting of the cement; initial clearance being provided by the usual methods so that the pin may be screwed into proper final position. Fig. 19 shows a ring with struts applied to the inside of a pin or cylindrical member which is cemented to the inside of porcelain shells. The purpose of the ring or strut being to supply the necessary rigidity to transfer the mechanical load but being of a lower linear coefficient of expansion than the outer metal shell, it will not end to set up a dangerous stress for temperature changes. By balancing the areas and using materials of the proper linear coefficient of expansion for changes in temperature, it is possible to maintain the same relative positions and stress in the dielectric for the same loading even though the temperature changes over a wide range.

The use of compound internal members which give approximately the same linear coefficient of expansion for changes in temperature as the porcelain or dielectric makes it possible to use wedging or compensating types of construction without so much danger of failure under operating conditions. In the types of construction shown in Figs. 3, 4 and 5 if the members of material having a low expansion rate are so proportioned that changes in temperature tend to maintain the same relative position with the same applied loads, the stress set up by changes in temperature will be eliminated. Where the surfaces are such that the parts will slip under a heavy load and compensate for the distortion or strain in the dielectric and metal, there would be much greater danger of failure due to the thermal stress which might add to the stress set up by the load. With the compensated arrangement this stress is eliminated and therefore types of construction may be used which might otherwise result in failure after a time.

Under many usual working conditions the load on an insulator tends to increase with a decrease in temperature. Under these conditions it would be an advantage if the pin or internal member did not contract as rapidly as the dielectric as the temperature decreases. Where the ordinary steel pin is used, particularly of the wedging type, the pin contracts at a greater rate than the dielectric and tends to drop as it contracts until the wedging action sets up forces which will compensate for the contraction and the stress of the load.

In a compensating type of pin, the use of material having a low coefficient of expansion makes it possible to increase the pressure between the pin and the dielectric for a reduction in temperature, thereby tending to hold the pin in normal position even though the load may be increased. Where the pin does not slip the stresses set up by a repeating thermal load cycle will necessarily be the same for each cycle. If, however, the pin slips during one cycle, the thermal cycle will not be the same during the next cycle and may cause distortion of the dielectric member. The ordinary steel pin of the wedging type contracts during falling temperature at a greater rate than the dielectric and will tend to be drawn down in its socket by the load so that the difference in contraction will be taken up. The point of slipping will of course depend upon the coefficient of friction and the applied load. When, after such lowering of the pin in its socket, the insulator heats up, the pin will expand at a greater rate than the dielectric shell and may set up stresses in the dielectric such that rupture will occur. Owing to the working load and the longitudinal expansion, there will of necessity be a tendency for wedging parts of the compensating type to creep so that the position assumed during a short period of time will give no accurate indication of the possible effect after a longer time.

The use of the compensating cap and pin having invar members applied with initial stress have particular advantages when used together, as shown in Fig. 5, for the working loads may be compensated for by slipping without any material change due to differential expansion or contraction between the metal parts and the dielectric shell. Since differential expansion or contraction of the parts of an insulator may set up stresses in the fragile dielectric much higher than that produced by the working load, it is seen that the combination of internal and external compensating members has particular advantages.

The slippage or compensating surface may be adjacent to the cement, as at 17 in Fig. 1, or between the two different metals, as at the threaded connection between the members 42 and pin 48 in Fig. 4. In Fig. 4 the radial and longitudinal expansion and contraction of the inner member is largely controlled by the sectors 42. While slipping may take place to compensate for distortion under very heavy applied loads on the outer face of the sectors 42, this may be compensated for by the conical bearing surface of the threads between the sectors and pin, which may be either threaded as shown or continuous grooves, since the sectors are separate. The angularity of the effective bearing surface will depend upon the result desired. Where the coefficient of friction is low between the metal surfaces, the parts will tend to restore themselves with a much less reduction of load.

I claim:

1. The method of controlling the thermal stresses between metal and dielectric parts of an insulator comprising the steps of cementing the parts together and applying a stress exerting member to one of said parts after the cement has set, in position to exert initial stress between said parts at the temperature at which said parts were assembled.

2. The method of manufacturing insulators comprising the steps of assembling metal and dielectric parts and thereafter applying to the metal part a reinforcing member having a coefficient of expansion and contraction for temperature changes less than that of the metal part and placing said reinforcing member under stress so as to exert a force on said metal part tending to set up initial stress between said metal and dielectric parts at the assembly temperature of said parts.

3. The method of manufacturing an insulator comprising the steps of assembling a dielectric member, and a metal cap surrounding a portion of said dielectric member, cementing said dielectric member and cap together and permitting the cement to harden and thereafter applying a reinforcing metal band to said cap and placing said band under initial stress to press said cap toward said dielectric member at the assembly temperature of said insulator.

4. The method of manufacturing an insulator comprising the steps of assembling metal and dielectric parts with members between said parts for transmitting the force from one to the other, the parts being closed together after the force transmitting means is inserted therebetween, and applying a metal retaining member to said parts after the parts have been assembled to hold said parts in their assembled relation.

5. The method of manufacturing an insulator comprising the steps of assembling a dielectric member within the recess of a metal cap, yielding force transmitting members being inserted between said dielectric member and cap, closing said cap against said force transmitting members and applying a reinforcing band to the outside of said cap to hold said cap in position against said force transmitting members, said band being placed under initial stress to exert a compression force on said cap and dielectric member at the assembly temperature of said insulator.

6. The method of adapting an insulator for a given working temperature range comprising the steps of applying a reinforcing member to said insulator after the parts of said insulator have been assembled and imparting stress to said reinforcing member suitable to counteract the effect of the load on said insulator for the range of temperature for which said insulator is designed.

7. The method of adapting an insulator to different ranges of operating temperatures comprising the steps of assembling metal and dielectric parts, the metal parts having a strength suitable for a given range of temperatures, applying to said insulator after it has been assembled a metal reinforcing ring, and imparting to said reinforcing ring a stress for counteracting the effect of the load on said insulators at a different range of temperatures from that for which said insulator is adapted without said ring.

8. The method of adapting an insulator to withstand the force of the load thereon throughout a given range of temperature comprising the steps of assembling the metal and dielectric parts of the insulator, applying a reinforcing member to one of said parts having a lower coefficient of expansion and contraction for temperature changes than said metal member and imparting initial stress to said reinforcing member in a direction to impart a force to said dielectric member opposed to a component of the force of the load on said dielectric member, the initial stress thus imparted being sufficient to withstand the force of the maximum load for which said insulator is designed at normal temperatures, the metal part having sufficient elasticity to prevent excessive pressure on said dielectric part at the minimum temperature to which said insulator is subjected.

9. The method of adapting an insulator to a wide range of temperatures comprising the steps of assembling a dielectric member and a metal member, the metal member being of sufficiently light construction and being sufficiently yielding to prevent damage to said dielectric member by contraction of said metal member when subjected to the minimum temperature for which said insulator is designed, and applying to said metal part a reinforcing member having a lower coefficient of contraction and expansion for temperature changes than said metal part, said reinforcing member being placed under stress at the mean operating temperature of said insulator sufficient to produce adequate holding pressure between said metal part and dielectric member at the maximum temperature and load for which said insulator is designed.

10. An insulator comprising a dielectric member, a cap enclosing a portion of said dielectric member, a pin disposed within a recess in said dielectric member, and separately formed reinforcing members on said cap and pin for controlling stresses set up in said dielectric member by differential expansion and contraction due to temperature changes.

11. An insulator comprising a dielectric member, a metal fitting surrounding a portion of said dielectric member and a reinforcing band on said fitting, said band being under tension at normal working temperatures for said insulator independently of the load on said insulator and exerting a compressive force on said fitting and on said dielectric member due to said stress.

12. An insulator comprising a dielectric member, a metal fitting for said member having a higher coefficient of expansion for temperature changes than said dielectric, a reinforcing member for said fitting held under stress at normal working temperatures for said insulator independently of the load on said insulator and exerting force on said fitting and on said dielectric member opposed to the component of the load transmitted to said fitting by said dielectric member, said reinforcing member having a coefficient of expansion for temperature changes different from that of said fitting.

13. An insulator comprising a dielectric member, a metal fitting surrounding a portion of said dielectric member and having a coefficient of expansion for temperature changes greater than that of said dielectric member, a reinforcing band on said fitting having a coefficient of expansion for temperature changes differing from that of said fitting, said reinforcing member being held under stress independently of the load on said insulator at normal working temperatures for said insulator and exerting a compressive force on said fitting and on said dielectric member to oppose the expansive force on said fitting due to the load on said insulator.

14. An insulator comprising a dielectric member, a metal fitting surrounding a portion of said dielectric member, a reinforcing band on said fitting placed under stress to exert compression on said fitting, and means for limiting the amount of stress in said reinforcing member.

15. In an insulator a dielectric member and a fitting for said dielectric member, said fitting comprising engaging metallic parts, each exerting force on the other, one of said parts being formed to yield when the force thereon exceeds a predetermined amount to limit the force said parts exert upon each other.

16. The process of assembling an insulator comprising the steps of assembling a dielectric member and a metal fitting, and thereafter applying a reinforcing member to said fitting to exert initial stress on said fitting and limiting the initial stress thus produced to a predetermined amount.

17. The method of assembling insulators comprising the steps of first assembling a dielectric member and a metal fitting and thereafter applying a reinforcing member to said fitting, and limiting the initial stress between said reinforcing member and fitting by yielding means arranged to yield when the desired stress is reached.

18. An insulator comprising a dielectric member having outer and inner metal fittings and compensating members applied to said metal fittings adjacent opposed surfaces of said dielectric member, said compensating members having a lower coefficient of expansion for temperature changes than said fittings.

ARTHUR O. AUSTIN.